UNITED STATES PATENT OFFICE.

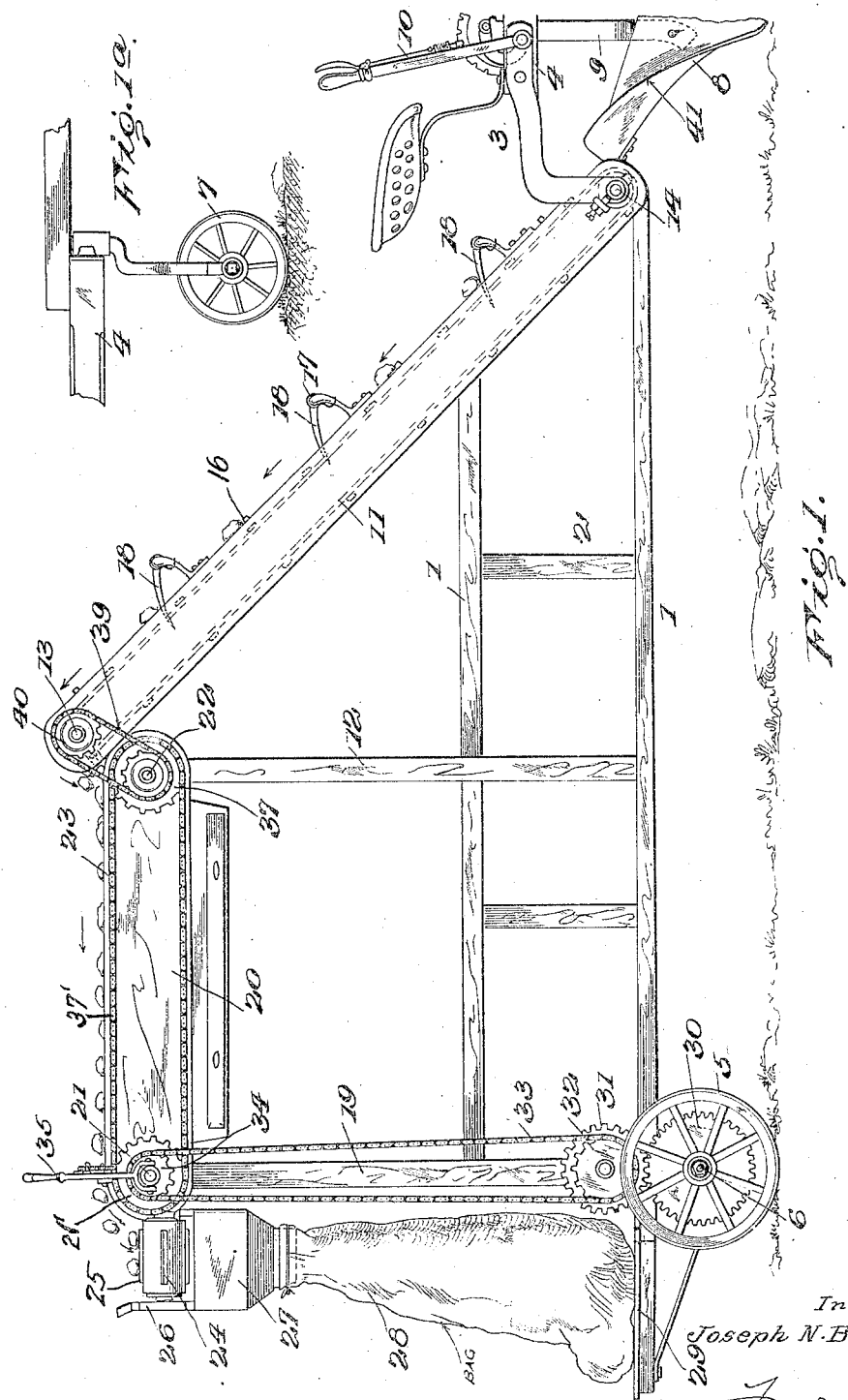

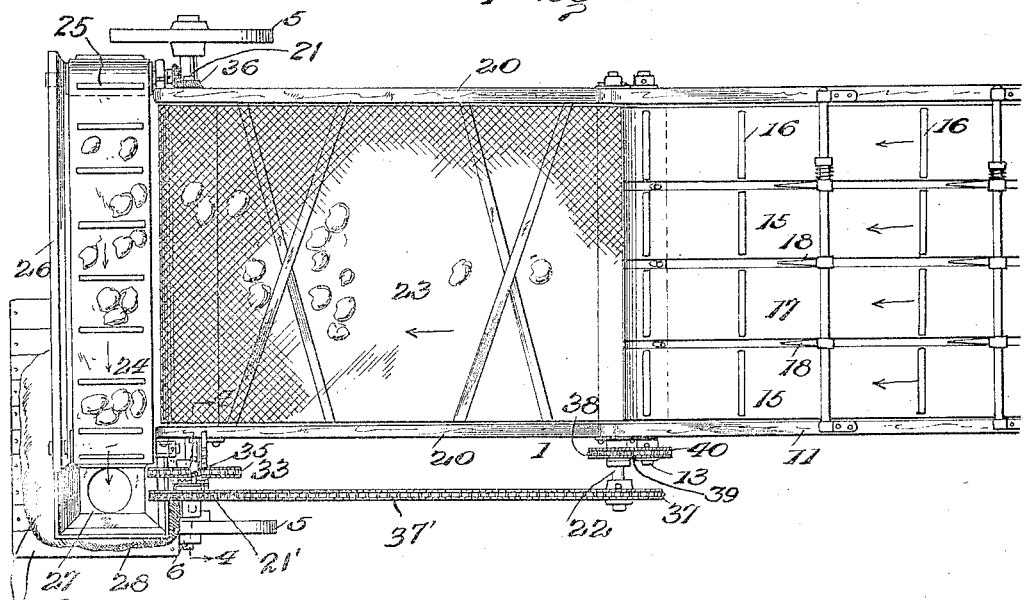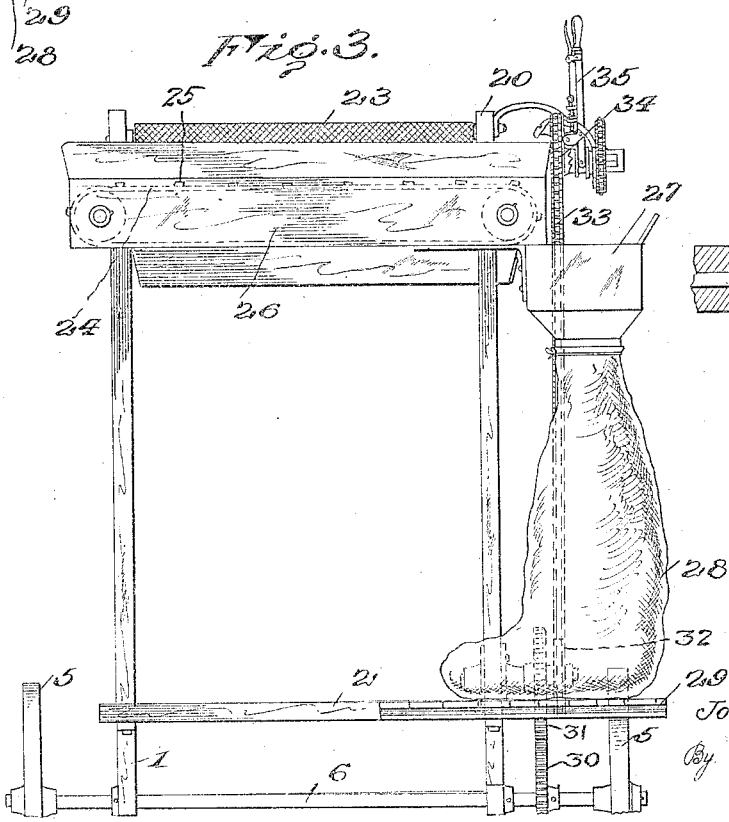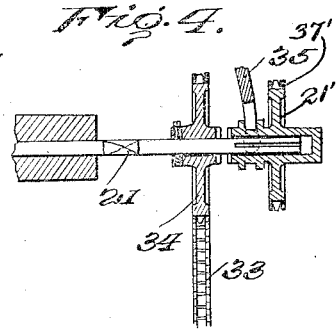

JOSEPH N. BORGLIN, OF SEATTLE, WASHINGTON.

VEGETABLE-DIGGER.

1,362,836.	Specification of Letters Patent.	Patented Dec. 21, 1920.

Application filed June 23, 1919. Serial No. 306,073.

*To all whom it may concern:*

Be it known that I, JOSEPH N. BORGLIN, a citizen of the United States, residing at Seattle, in the county of King and State of Washington, have invented certain new and useful Improvements in Vegetable-Diggers, of which the following is a specification.

This invention relates to an improvement in vegetable diggers and sackers, in the use of which the vegetables are dug from the earth, separated from earth and other foreign material, and delivered to a sack or other receptacle, in a single continuous operation.

The improved machine provides an inclined elevator to receive the vegetables from a digging implement, with means to separate the earth and other foreign material from the vegetable during travel on such elevator. From the elevator the vegetables are delivered onto a horizontal sifting conveyer to further remove any remaining dirt, and from which conveyer the vegetables are delivered to a laterally traveling conveyer, and conveyed to a discharge chute leading to a bag or other receptacle.

The invention provides means whereby all moving parts are positively and automatically actuated from one of the ground wheels of the machine, with a manual clutch control for governing such operation.

In the drawings:—

Figure 1 is a side elevation of the improved machine.

Fig. 1ª is a side elevation of the forward ground wheel and a portion of the tongue.

Fig. 2 is a plan of the same.

Fig. 3 is a rear elevation of the same.

Fig. 4 is a section on line 4—4 of Fig. 2.

The improved machine comprises a main frame including side bars 1 and cross bars 2. At the forward end the main frame has an elevated seat supporting frame 3 from which extends the draft tongue 4. The rear end of the main frame is supported on rear ground wheels 5 mounted on an axle 6, while a similar forward ground wheel 7 supports the tongue 4.

Movably connected to the forward end of the main frame is a digging implement, here shown as a plow share 8, a bar 9 secured to the plow share rising through the seat frame 3, and adjustable by a hand lever 10 to control the cutting depth of the implement.

Rising from the forward end of the main frame, and inclining rearwardly therefrom is an elevator frame, including side bars 11, supported at the rear ends on uprights 12 rising from the main frame. Upper and lower transverse shafts 13 and 14 are mounted in the side bars 11, and a series of parallel, relatively spaced, endless belts 15 travel over such shafts, each belt having flights 16.

Secured in and extending between the side bars 11, and above the belts 15, are rockshafts 17, from which extend fingers 18, adapted to project between the adjacent belts.

A conveyer frame is supported on the uprights 12 and similar uprights 19, including side bars 20, having shafts 21, 22, mounted transversely of and at the respective ends thereof. A belt 23 is arranged to travel over the shafts, which belt is of screen formation as shown. In rear of the conveyer belt 23 is arranged a lateral conveyer, here shown as a belt 24 with flights 25 thereon. This belt 24 travels over rollers mounted in bars 26 arranged transversely of the main frame, so that the belt 24 travels in a direction at right angles to the direction of travel of belt 23.

The belt 24 discharges into a chute 27, the lower end of which may be appropriately formed to receive the mouth of a bag 28, supported on a platform 29, extending rearwardly from the main frame.

One of the rear ground wheels 5 has secured a gear 30, and above such gear 30, there is secured in the main frame a stub shaft on which is arranged a gear 31 to mesh with the gear 30 and a sprocket wheel 32 secured to such gear 31. A sprocket chain 33 connects wheel 32 with a sprocket wheel 34 slidably mounted on shaft 21 and controlled by a lever 35. The hub of wheel 34 forms one element of a clutch the other element of which is on the shaft 21, so that through the lever 35, the driving of shaft 21 may be controlled at will.

A bevel gear 36 is secured on shaft 21, engaging a similar gear on the adjacent shaft of one of the rollers of the lateral conveyer. A sprocket wheel 37 is mounted on shaft 22 of the screen conveyer connected by a chain 37' to a sprocket wheel 21' on shaft 21 and an additional sprocket wheel 38 on the shaft 22 is connected by a chain 39 with a sprocket wheel 40 on shaft 13 of the elevator. Power is thus delivered for all moving parts from the ground wheel, with operative connection at the will of the driver.

The plow share is preferably provided with an upturned edge 41 so that the vegetables as dug will be directed onto the elevator, and during travel thereon, a material part of the accompanying dirt will be loosened by the fingers 18 and discharged between the belts 15. In travel over the screen conveyer the remaining particles of dirt are sifted from the vegetables, and the latter are delivered to the lateral conveyer and then to the delivery chute and to the sack.

Claim:—

The combination with a vegetable digger of an elevator including a frame having sidebars, transverse shafts mounted at each end of said frame, spaced belts mounted on the shafts, a plurality of rock-shafts mounted on the upper edge of the side-bars beyond the belts, scraper fingers mounted thereon, the ends normally extending between the belts, whereby the scraper fingers are adapted to knock loose dirt from vegetables carried by the conveyer and are further adapted to allow the vegetables to pass between the belts and fingers.

In testimony whereof I affix my signature.

JOSEPH N. BORGLIN.